(12) United States Patent
Kim et al.

(10) Patent No.: US 9,304,320 B2
(45) Date of Patent: Apr. 5, 2016

(54) HEAD-MOUNTED DISPLAY AND METHOD OF CONTROLLING THE SAME

(71) Applicant: LG ELECTRONICS INC., Seoul (KR)

(72) Inventors: Jihwan Kim, Seoul (KR); Doyoung Lee, Seoul (KR); Sinae Chun, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/152,561

(22) Filed: Jan. 10, 2014

(65) Prior Publication Data

US 2015/0084840 A1    Mar. 26, 2015

(30) Foreign Application Priority Data

Sep. 26, 2013  (KR) .................. 10-2013-0114781

(51) Int. Cl.
*G09G 5/00* (2006.01)
*G02B 27/01* (2006.01)

(52) U.S. Cl.
CPC .................... *G02B 27/017* (2013.01)

(58) Field of Classification Search
None
See application file for complete search history.

(56) References Cited

U.S. PATENT DOCUMENTS

| | | | |
|---|---|---|---|
| 6,560,029 B1 | 5/2003 | Dobbie et al. | |
| 2006/0055786 A1* | 3/2006 | Ollila ....................... | 348/207.99 |
| 2006/0121993 A1* | 6/2006 | Scales et al. .................... | 463/48 |
| 2006/0153409 A1 | 7/2006 | Yeh | |
| 2007/0025723 A1 | 2/2007 | Baudisch et al. | |
| 2007/0030442 A1* | 2/2007 | Howell et al. ................ | 351/158 |
| 2013/0002559 A1 | 1/2013 | Vardi | |
| 2013/0033610 A1 | 2/2013 | Osborn | |

FOREIGN PATENT DOCUMENTS

| | | |
|---|---|---|
| JP | 2009-206584 A | 9/2009 |
| JP | 2009206584 A * | 9/2009 |

* cited by examiner

*Primary Examiner* — Ilana Spar
*Assistant Examiner* — Kirk Hermann
(74) *Attorney, Agent, or Firm* — Birch, Stewart, Kolasch & Birch, LLP

(57) ABSTRACT

Disclosed herein are a head-mounted display and a method of controlling the same, more particularly, a method of displaying an image preview interface based on the position of a camera unit in the case that the camera unit mounted to a head-mounted display is detached.

18 Claims, 12 Drawing Sheets

(a)

(b)

(a)

(b)

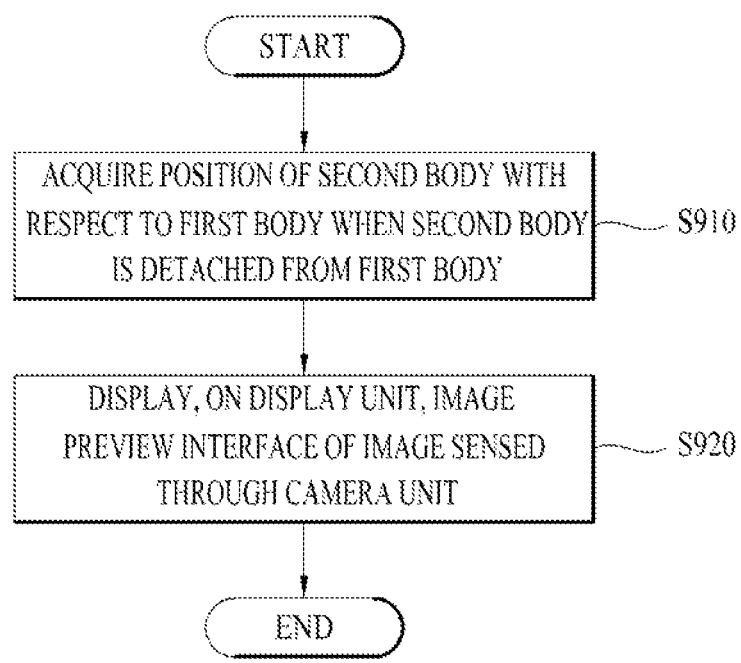

HEAD-MOUNTED DISPLAY AND METHOD OF CONTROLLING THE SAME

This application claims the benefit of the Korean Patent Application No. 10-2013-0114781, filed on Sep. 26, 2013, which is hereby incorporated by reference as if fully set forth herein.

BACKGROUND OF THE INVENTION

1. Field of the Invention

This specification relates to a head-mounted display and a method of controlling the same, more particularly, to a method of displaying an image preview interface based on the position of a camera unit in the case that the camera unit mounted to a head-mounted display is detached.

2. Discussion of the Related Art

Head-mounted displays (HMDs) refer to various types of digital devices worn on the head like glasses to receive multimedia content provided. According to the current trend of ever lighter weight and more compact digital devices, various wearable computers are under development, and HMDs are also widely used. HMDs may provide a variety of conveniences to users beyond a simple function of display by being combined with the augmented reality technology and the N-Screen technology.

For example, in the case that an HMD is equipped with a microphone and a speaker, a user can make a phone call, wearing the HMD. In addition, in the case that the HMD is equipped with a camera, the user can capture an image of an object in a desired direction, wearing the HMD.

SUMMARY OF THE INVENTION

Accordingly, this specification is directed to a head-mounted display and a method of controlling the same that substantially obviate one or more problems due to limitations and disadvantages of the related art.

An object of this specification is to determine the position of an image preview interface within a display unit according to the position of a camera of a head-mounted display (HMD) in the case that the camera of the HMD is detached.

Another object of this specification is to determine the position of the image preview interface within the display unit according to the position of an eye of a user with respect to the display unit in the case that the camera of the HMD is detached.

Another object of this specification is to determine the position of the image preview interface within the display unit according to an image capturing direction of the camera in the case that the camera of the HMD is detached.

A further object of this specification is to determine the position of the image preview interface within the display unit according to the orientation of the HMD in the case that the camera of the HMD is detached.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head-mounted display (HMD) includes a first body and a second body, wherein the first body includes a display unit configured to display visual information, a first communication unit configured to transmit/receive data, and a processor configured to control the display unit and the first communication unit, and the second body includes a camera unit configured to sense an image, a second communication unit configured to transmit/receive data, and a sensor unit configured to detect an input signal, wherein the second body is mountable to and detachable from the first body, wherein, when the second body is detached from the first body, the processor is further configured to acquire a position of the second body with respect to the first body, and displays, on the display unit, an image preview interface of the image sensed through the camera unit, wherein a position of the image preview interface is determined based on the position of the second body.

In another aspect of the present invention, a method of controlling a head-mounted display including a first body and a second body, wherein when the second body is detached from the first body, the method comprising, the steps of acquiring a position of the second body with respect to the first body, and displays, on the display unit, an image preview interface of an image sensed through the camera unit, wherein a position of the image preview interface is determined based on the position of the second body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a flowchart illustrating a method of controlling the HMD of this specification.

DETAILED DESCRIPTION OF THE INVENTION

Although the terms used in this specification have been selected, as much as possible, from general terms that are widely used at present while taking into consideration of the functions obtained in accordance with one embodiment, these terms may be replaced by other terms based on intentions of those skilled in the art, customs, emergence of new technologies, or the like. In addition, in a particular case, terms that are arbitrarily selected by the applicant may be used. In this case, meanings of these terms may be disclosed in corresponding description parts of the invention. Accordingly, it should be noted that the terms used herein should be construed based on practical meanings thereof and the whole content of this specification, rather than being simply construed based on names of the terms.

Embodiments will now be described in detail with reference to the accompanying drawings and the content disclosed therein. However, this specification is not limited to or constrained by the embodiments. Wherever possible, the same reference numbers will be used throughout the drawings to refer to the same or like parts.

Figure 1:
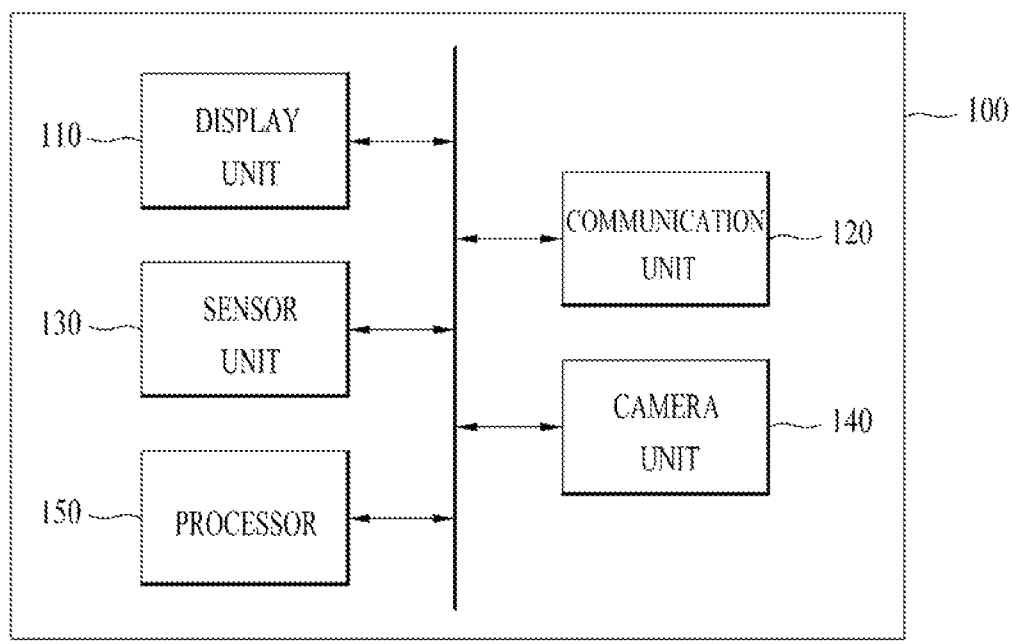
FIG. 1 is a block diagram illustrating a head-mounted display (HMD) of this specification.

FIG. 1 is a block diagram illustrating a head-mounted display (HMD) disclosed in this specification. In FIG. 1 illustrating one embodiment, some constituent modules may be omitted, or new constituent modules may be added by a person skilled in the art, as desired.

As shown in FIG. 1, the HMD 100 according to one embodiment may include a display unit 110, a communication unit 120, a sensor unit 130, a camera unit 140 and a processor 150.

The HMD 100 may include a first body and a second body. The first body, which is a main body of the HMD 100, may include the display unit 110, a first communication unit, and the processor 150. The second body, which is a detachable sub-body of the HMD 100, may include the camera unit 140, a second communication unit, and the sensor unit 130. The aforementioned first body and second body are one embodiment, and some constituent units of the first body and second body may be changed or new constituent units may be added to the first body and second body by a person skilled in the art, as desired. Additional description of the first body and second body will be given with reference to FIG. 2.

The display unit 110 may display visual information. Herein, the visual information may include content, an application, an image, and a video. More specifically, the display unit 110 may output the visual information to the screen based on a control command from the processor 150. In this specification, the display unit 110 may be included in the first body of the HMD 100.

In this specification, the HMD 100 may output an image to the display screen in various techniques. In one embodiment, the HMD 100 may output an image with a see-through technique. Herein, the see-through technique, which employs a transparent display screen, represents a technique allowing a user wearing the HMD 100 to use content while recognizing the surrounding environment. In another embodiment, the HMD 100 may output an image with a front-light technique. Herein, the front-light technique represents a technique of displaying a reflected image using a reflector such as a mirror without directly projecting light into the eyes.

Also, in another embodiment, the HMD 100 may output an image with a see-closed technique. Herein, the see-closed technique represents a technique of using content through the display screen while an external environment is not visible through the display screen. In this specification, the HMD 100 is assumed to display an image using the see-through or front-light technique.

The communication unit 120 may communicate with an external device and transmit/receive data using various protocols. In addition, the communication unit 120 may access a network in a wired or wireless manner to transmit/receive digital data such as content. For example, the communication unit may use communication standards such as wireless LAN (WLAN or Wi-Fi), wireless broadband (WiBro), world interoperability for microwave access (WiMax), and high speed downlink packet access (HSDPA) to access a wireless network.

In this specification, the communication unit 120 may include a first communication unit and a second communication unit. As described above, the first communication unit may be provided to the first body, and the second communication unit may be provided to the second body. For example, the first communication unit and second communication unit may transmit/receive data to/from the processor 150 included in the first body, and may transmit/receive a signal to/from the camera unit 140 included in the second body.

The sensor unit 130 may sense a surrounding environment of the HMD 100 using at least one sensor mounted to the HMD 100, and deliver a signal for the same to the processor 150.

The sensor unit 130 may include at least one sensing means. According to one embodiment, the at least one sensing means may include a gravity sensor, a geomagnetic sensor, a motion sensor, a gyroscope sensor, an acceleration sensor, an infrared sensor, an inclination sensor, an illuminance sensor, an altitude sensor, an olfactory sensor, a temperature sensor, a depth sensor, a pressure sensor, a bending sensor, an audio sensor, a video sensor, a global positioning system (GPS) sensor, a touch sensor and a grip sensor.

In addition, the sensor unit 130, which is a general term for the various sensing means described above, may sense various inputs from the user and the environment of the HMD 100 and deliver a result of sensing to the processor 150 such that the processor 150 can perform an operation corresponding to the sensed inputs and environment. The aforementioned sensors may be included in the HMD 100 as separate elements or by being integrated into at least one element.

In this specification, the sensor unit 130 may be included in the first body. The sensor unit 130 may detect a signal for detachment of the first body from the second body. In addition, the sensor unit 130 may detect an image capturing signal and a video capturing signal. Herein, the image capturing signal and the video capturing signal may correspond to touch inputs to the second body. Meanwhile, the sensor unit 130 may be provided not only to the second body but also to the first body. That is, the sensor unit 130 may be provided to the first body to detect input signals.

The camera unit 140 may sense an image. More specifically, the camera unit 140 may capture an image of an object in the front. Herein, the front may correspond to the direction in which the camera unit 140 faces. In addition, the camera unit 140 may sense an image within the range of view angle, and provide the same to the processor 150. Herein, the range of view angle refers to the range of horizontal and vertical viewing angles that may be covered by the screen in sensing an image.

In this specification, the camera unit 140 may be included in the second body. For example, the camera unit 140 included in the second body may sense an image of an object in the front of the camera unit 140 while being mounted to the first body. In addition, the camera unit 140 included in the second body may sense an image while being detached from the first body. Meanwhile, in this specification, the camera unit 140 may be provided not only to the second body but also to the first body. That is, the camera unit 140 may be provided to the first body to detect the position of an eye of the user.

The processor 150 may process data, control the respective units of the HMD 100 described above, and control transmission/reception of data between the units. In this specification, the processor 150 may be included in the first body. For example, the processor 150 may control not only the display unit 110 and the first communication unit included in the first body, but also the camera unit 140, the second communication unit, and the sensor unit 130 included in the second body. The processor 150 may be separately provided to the second body in addition to the first body. That is, the processor 150 may be separately provided to the second body to control constituent units included in the second body.

In this specification, in the case that the second body is detached from the first body, the processor 150 may acquire the position of the second body with respect to the first body. In addition, the processor 150 may display, on the display unit 110, an image preview interface for an image sensed through the camera unit 140. Operations of the processor 150 will be described in detail with reference to FIGS. 3 to 8.

According to one embodiment of this specification, the operations performed by the HMD 100 may be controlled by the processor 150. In the following descriptions and drawings, these operations will commonly be described as being performed/controlled by the HMD 100, for ease of description.

Although not shown in FIG. 1, the HMD 100 may include a power unit, storage unit, and audio unit. The power unit is a power source connected to the internal battery of the HMD 100 or an external power source. The power unit may supply power to the HMD 100. In addition, the storage unit may store various digital data including audio data, photos, videos and applications. The storage unit may represent various digital data storage spaces including a flash memory, a random access memory (RAM), and a solid state drive (SSD). In addition, the audio unit may receive or output audio data through the microphone and the speaker.

FIG. 1 is a block diagram of the HMD 100 according to one embodiment. The individually indicated blocks show elements of the HMD 100 which are logically distinguished from each other. Accordingly, the illustrated elements of the HMD 100 may be mounted to one chip or a plurality of chips according to the design of the device.

Figure 2:
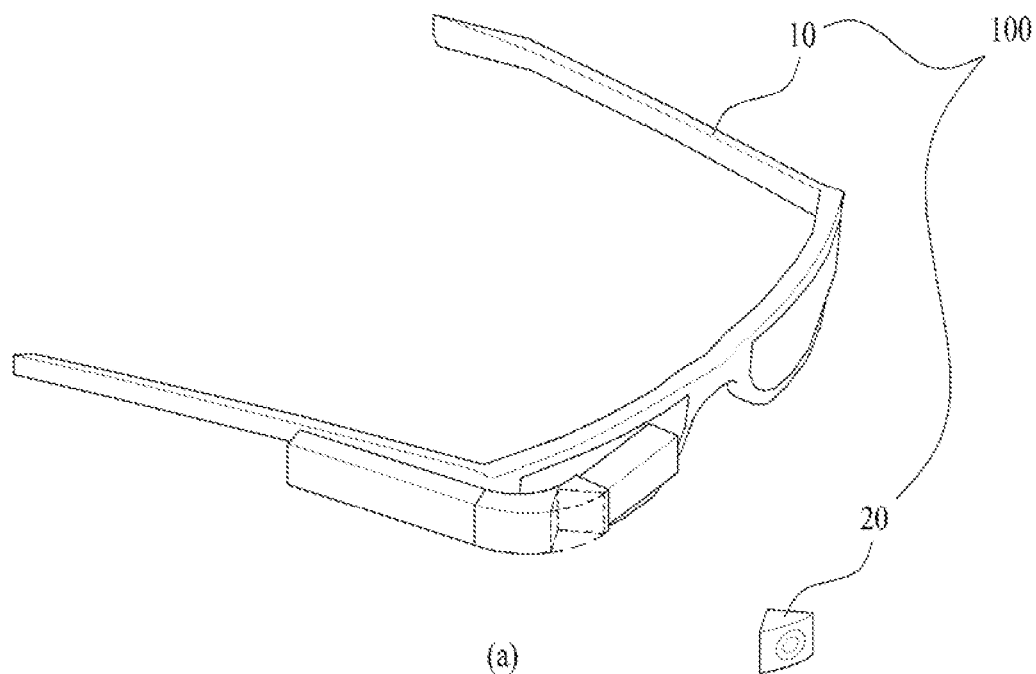
FIG. 2 is a view illustrating an embodiment of the HMD of this specification.
Figure 2:
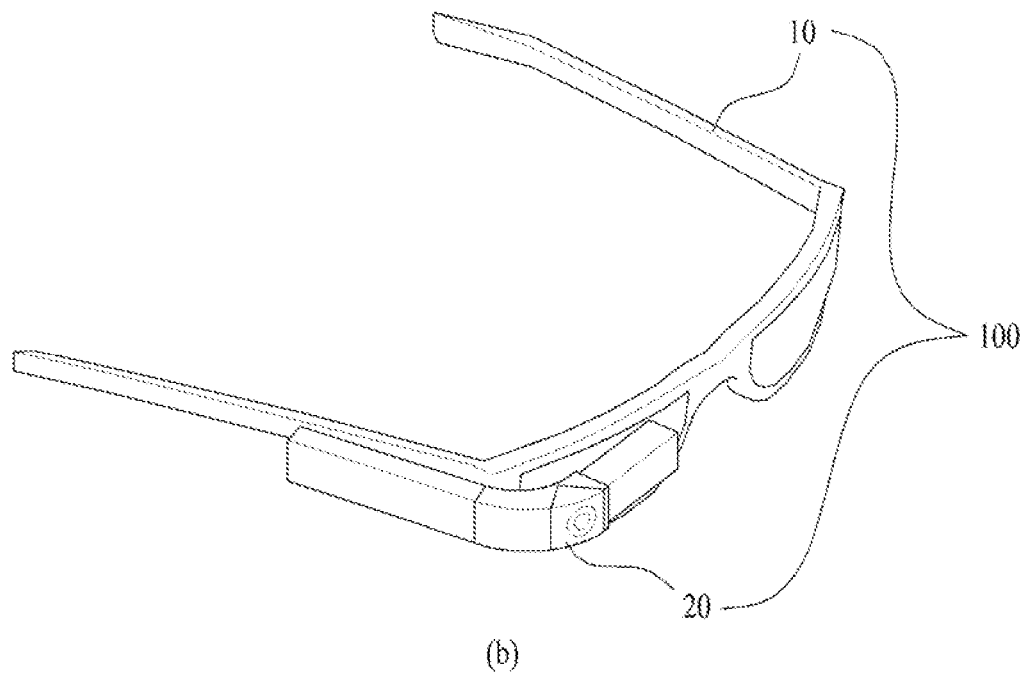

FIG. 2 is a view illustrating an embodiment of the HMD of this specification. More specifically, FIG. 2(*a*) illustrates the HMD 100 with the second body 20 detached from the first body 10. FIG. 2(*b*) illustrates the HMD 100 with the second body 20 mounted to the first body.

As described above with reference to FIG. 1, the HMD 100 may include the first body 10 and the second body 20. In addition, the first body 10 may correspond to the main body of the HMD 100, and the second body 20 may correspond to a sub-body of the HMD 100.

In this specification, the first body 10 may be provided with a display unit, a first communication unit, and a processor. The first body 10 may be additionally provided with a camera unit and a sensor unit. In this specification, the second body 20 may be provided with a camera unit, a second communication unit, and a sensor unit. The second body 20 may be additionally provided with a processor operating independently of the processor of the first body 10, as described above with reference to FIG. 1.

In addition, as shown in FIG. 2, the second body 20 may be detached from and mounted to the first body 10. Thereby, the camera unit included in the second body 20 may sense an image at various angles when detached from or mounted to the first body 10. The second body may be detached from and mounted to the first body 10 in various ways. For example, a portion of the first body 10 or the second body 20 that is detached and mounted may be provided with a magnetic part to allow the second body 20 to be detached from and mounted to the first body. In addition, a portion of the first body 10 or the second body 20 that is detached and mounted may be configured with a connection structure to facilitate detachment and mounting of the second body 20 from and to the first body 10.

Hereinafter, a description will be given of embodiments for the position of the image preview interface 30 according to the positional relationship between the first body 10 and the second body 20, with reference to FIGS. 3 to 8. In this regard, each of FIGS. 3 to 8 may include the steps of separating the second body 20 from the first body 10 and activating a camera interface.

That is, in FIGS. 3 to 8, the HMD 100 may detect detachment of the second body 20 from the first body 10. More specifically, the HMD 100 may detect a signal for detachment of the second body 20 from the first body 10. Herein, the detachment signal may be detected by a sensor unit provided to the first body 10 or the second body 20.

In addition, in FIGS. 3 to 8, in the case that the second body 20 is detached from the first body 10, the HMD 100 may activate the camera interface. Herein, the camera interface may correspond to an image capture application. That is, when the user 1 separates the second body 20 including the camera unit from the first body 10, the HMD 100 may recognize the detachment as being intended to execute the camera interface. Meanwhile, the HMD 100 may also activate the camera interface when the second body 20 is mounted to the first body 10.

Figure 3:
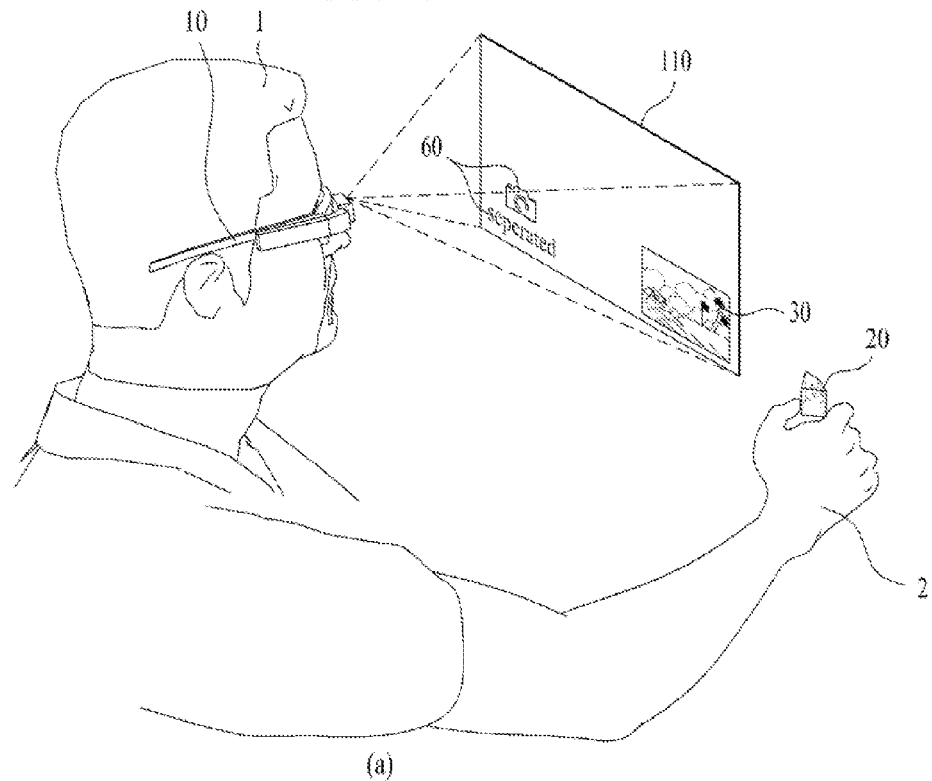
FIG. 3 is a view illustrating a method of controlling the HMD according to a first embodiment of this specification.
Figure 3:
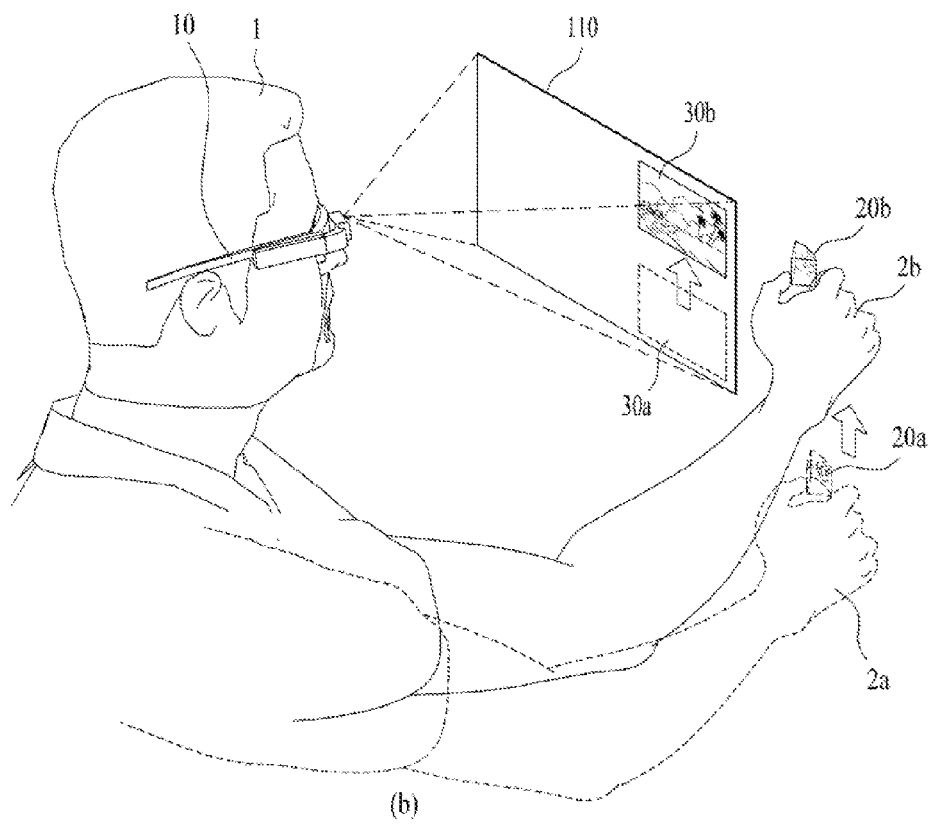

FIG. 3 is a view illustrating a method of controlling the HMD according to a first embodiment of this specification. More specifically, FIG. 3(*a*) illustrates the position of the image preview interface 30 based on the position of the second body 20, and FIG. 3(*b*) illustrates the position of the image preview interface 30 based on the change in position of the second body 20.

First, the HMD 100 may acquire the position of the second body 20 with respect to the first body 10. Herein, the position of the second body 20 with respect to the first body 10 may correspond to the direction of the second body 20 with respect to the first body 10. For example, referring to FIG. 3(*a*), the position of the second body 20 with respect to the first body 10 may be the lower right end with respect to the first body 10. The position of the second body 20 is a relative position. It may correspond to the left side or the upper end depending upon the position of an object taken as a reference.

In addition, the HMD 100 may display the image preview interface 30 for an image sensed through the camera unit of the display unit 110. Herein, the position of the image preview interface 30 may be determined based on the position of the second body 20 with respect to the first body 10. Meanwhile, in a see-through HMD, the image preview interface 30 is separately provided to prevent confusion between the external environment seen in the eyes of the user 1 and the image sensed through the camera.

For example, referring to FIG. 3(*a*), the position of the second body 20 with respect to the first body 10 corresponds to the lower right end with respect to the first body 10, and thus the position of the image preview interface 30 may correspond to the lower right end of the display unit 110. In addition, for example, in the case that the position of the second body 20 with respect to the first body 10 is at the upper left end, the position of the image preview interface 30 may correspond to the upper left end of the display unit 110. Thereby, the user 1 may readily recognize the position of the second body 20 including in the camera unit, based on the position of the image preview interface 30 displayed on the display unit 110.

In addition, although not shown in FIG. 3, the HMD 100 may acquire a distance between the first body 10 and the second body 20. Herein, the distance between the first body 10 and the second body 20 may be a lineal distance.

In this case, the HMD 100 may determine the size of the image preview interface 30 based on the distance between the first body 10 and the second body 20. For example, when the distance between the first body 10 and the second body 20 is less than a predetermined distance, the HMD 100 may display the image preview interface 30 by increasing the size thereof. In addition, for example, when the distance between the first body 10 and the second body 20 is greater than the predetermined distance, the HMD 100 may display the image preview interface 30 by reducing the size thereof. Thereby, the user 1 may readily recognize the distance between the first body 10 and the second body 20 according to change in size of the image preview interface 30.

Although not shown in FIG. 3, even in the case that the second body 20 is mounted to the first body 10, the HMD 100 may display the image preview interface 30. For example, for a see-through HMD, the HMD 100 can directly show the external environment therethrough, and accordingly a separate image preview interface may be displayed. Instead, an indicator to indicate that the image preview interface is provided may be displayed to inform the user 1 that the camera interface is being executed.

In addition, as shown in FIG. 3(a), in the case that the second body 20 is detached from the first body 10, the HMD 100 may display a separated-mode indicator 60. Herein, the separated-mode indicator 60, which serves as an indicator that indicates that the second body 20 has been detached from the first body 10, may be displayed in various forms. Although the separated-mode indicator 60 is not separately shown in FIGS. 4 to 8, it will hereinafter be assumed that it is displayed, as in FIG. 3.

Meanwhile, the HMD 100 may acquire change of the position of the second body 20 with respect to the first body 10. Herein, change of the position of the second body 20 with respect to the first body 10 indicates the change of the direction of the second body 10 with respect to the first body 10. For example, referring to FIG. 3(b), as the position of the hand 2 of the user 1 changes from 2a to 2b, the position of the second body 20 with respect to the first body 10 from the lower right end to the upper right end.

Thereby, in response to the changed position of the second body 20, the HMD 100 may change the position of the image preview interface 30. For example, referring to FIG. 3(b), as the position of the second body 20 changes from 20a to 20b, the HMD 100 may display the image preview interface 30 by changing the position thereof from 30a to 30b. Thereby, the user 1 may readily recognize change of the position of the second body 20 through the change in position of the image preview interface 30 displayed on the display unit 110.

Figure 4:
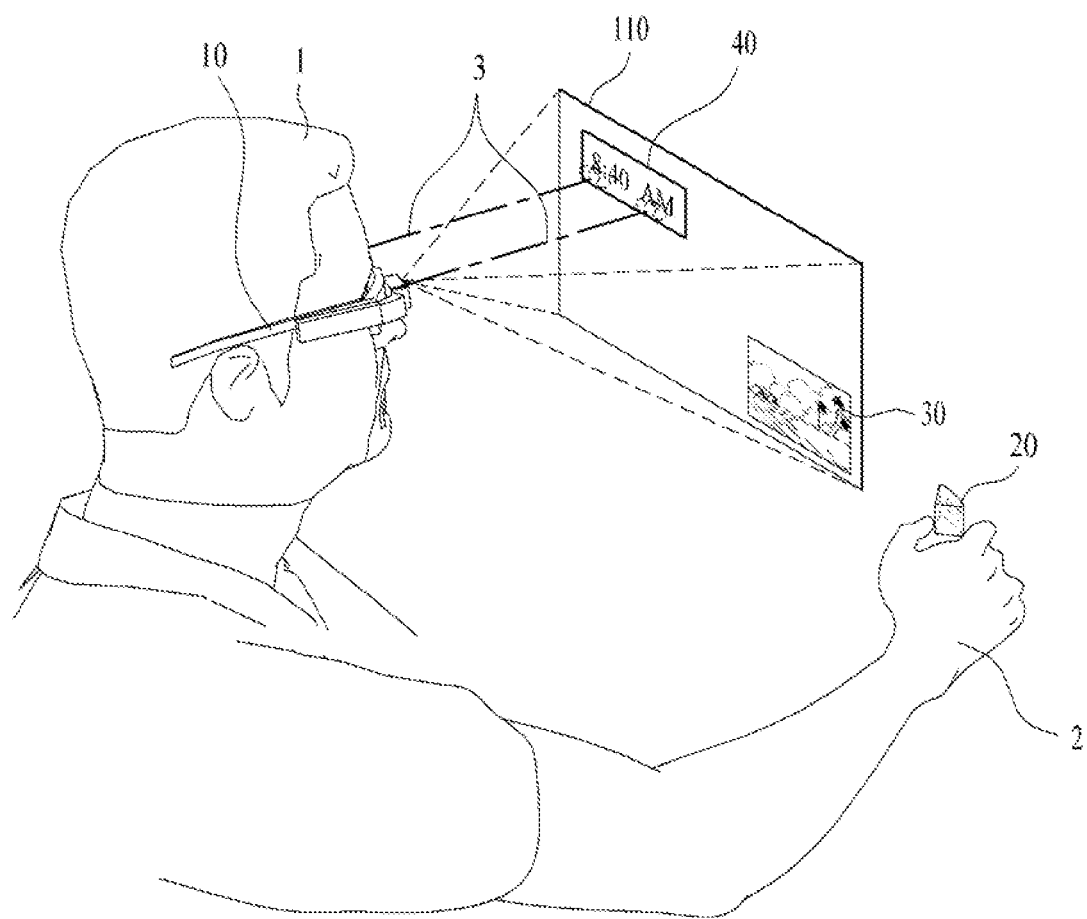
FIG. 4 is a view illustrating a method of controlling the HMD according to a second embodiment of this specification.

FIG. 4 is a view illustrating a method of controlling the HMD according to a second embodiment of this specification. More specifically, FIG. 4 shows the position of the image preview interface 30 according to the gaze location 3 of the user 1 and the position of the second body 20.

First, the HMD 100 may acquire the gaze location 3 of the user 1 with respect to the display unit 110 and the position of the second body 20 with respect to the first body 10. Herein, the gaze location 3 of the user 1 may be acquired in various ways. For example, the gaze location 3 of the user 1 may be acquired by the camera unit included in the second body 20. In addition, for example, in the case that the camera unit is mounted to the first body 10, the gaze location 3 of the user 1 may be acquired by the camera unit mounted to the first body 10. In FIG. 4, the gaze location 3 of the user 1 may be disposed on a display object 40 displayed on the display unit 110.

In addition, as described above with reference to FIG. 3, the position of the second body 20 with respect to the first body 10 may correspond to the direction of the second body 20 with respect to the first body 10. In FIG. 4, the position of the second body 20 with respect to the first body 10 may be at the lower right end.

Next, the HMD 100 may display the image preview interface 30 on the display unit 110. Herein, the image preview interface 30 may be positioned in various ways according to the type of the image preview interface 30. That is, depend upon whether the image preview interface 30 is intended for image capture or video capture, the position at which the image preview interface 30 is displayed may be different.

In one embodiment, in the case that the image preview interface 30 is intended for image capture, the position of the image preview interface 30 may be determined based on the position of the second body 20 with respect to the first body 10. That is, the position of the image preview interface 30 may be determined the position of the second body 20, regardless of the gaze location 3 of the user 1. This is because determining the position of the image preview interface 30 based on the position of the second body 20 rather than on the gaze location 3 of the user 1 is more intuitive for the user 1. In addition, the gaze location 3 of the user 1 is arranged with respect to the display object 40, the image preview interface 30 may be provided at a fixed position regardless of the gaze location 3 of the user 1, which may reduce confusion caused to the user 1.

In this case, the HMD 100 may display the image preview interface 30 on the display unit 110 before detecting an image capturing signal. That is, the user 1 may confirm an image sensed through the image preview interface 30, and then implement an input for capturing the image.

In another embodiment, in the case that the image preview interface 30 is intended for video capture, the position of the image preview interface 30 may be determined based on the gaze location 3 of the user 1. That is, the position of the image preview interface 30 may be determined based on the gaze location 3 of the user 1 with respect to the display unit 110, regardless of the position of the second body 20. In the case that the image preview interface 30 is intended for video capture, a video may be continuously captured for a long time. Accordingly, compared to the case of capturing an image, the user 1 may need to continuously gaze at the image preview interface 30.

In this case, the HMD 100 may first detect a video capturing signal. Next, the HMD 100 may display the image preview interface 30 based on the detected video capturing signal. For example, the image preview interface 30 may be continuously displayed before and after the video capturing signal is detected.

Meanwhile, the HMD 100 may display at least one display object 40 on the display unit 110. Herein, the at least one display object 40 may correspond to widgets of various applications displayed on the display unit 110. For example, the at least one display object 40 may include a clock, a weather, a calendar and a message.

In addition, the HMD 100 may determine the position to display the at least one display object 40 based on the gaze location 3 of the user 1 with respect to the display unit 110. As shown in FIG. 4, the at least one display object 40 may be displayed at the gaze location 3 of the user 1. The object 40 only needs to be displayed at a position adjacent to the gaze location 3 of the user 1 without being accurately displayed at the gaze location 3 of the user 1. Since the object 40 is displayed to allow the user 1 to use the object 40, the object 40 is preferably displayed at a position adjacent to the gaze location 3 of the user 1.

Figure 5:
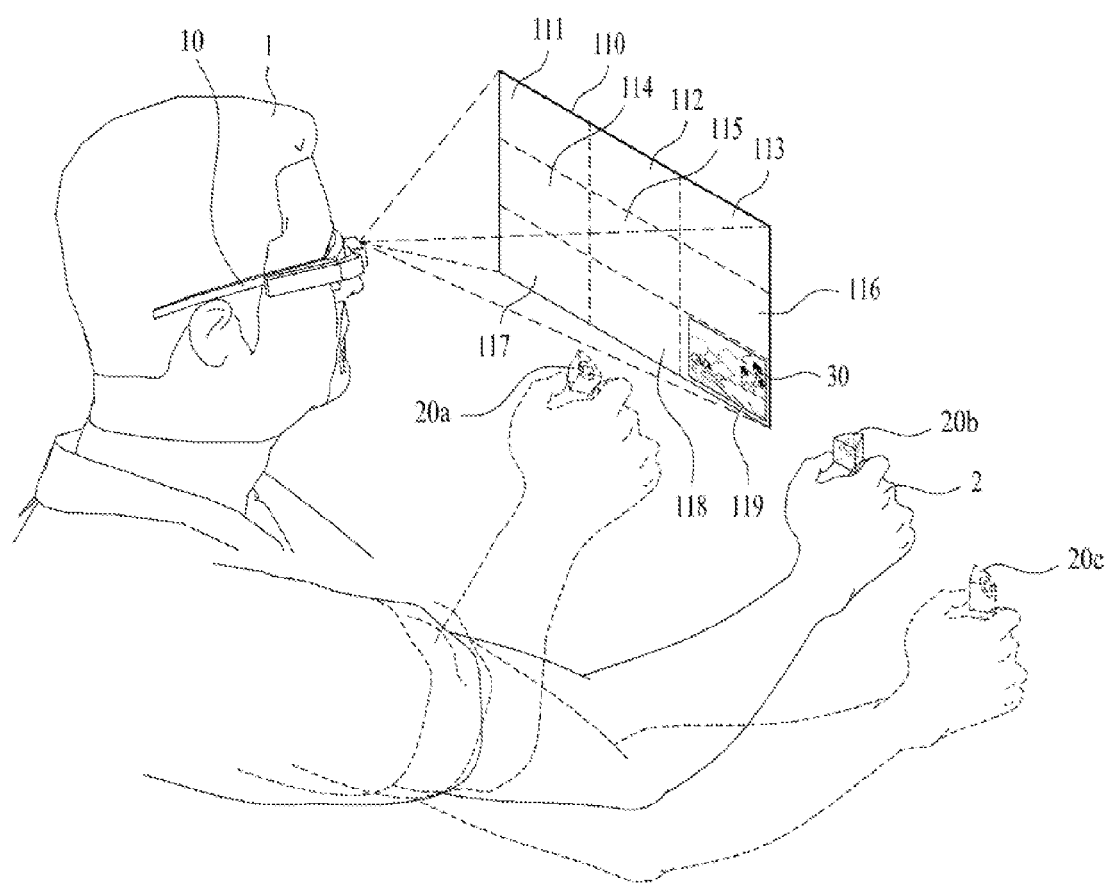
FIG. 5 is a view illustrating a method of controlling the HMD according to a third embodiment of this specification.

FIG. 5 is a view illustrating a method of controlling the HMD according to a third embodiment of this specification. More specifically, FIG. 5 illustrates a position at which the image preview interface 30 is displayed in the case that the display unit 110 is divided into a plurality of display areas.

In the HMD 100, the display unit 110 may be divided into a plurality of display areas 111 to 119. The areas may be predetermined areas in the HMD 100 or may be divided by the user 1. For example, the display unit 110 may be equally divided horizontally and vertically into four display areas. Also, for example, as shown in FIG. 5, nine display areas may be provided by dividing the display unit 110 horizontally and vertically in to nine. In addition, the display unit 110 may be divided in various ways to provide display areas.

Next, the HMD 100 may display the image preview interface 30 on the display unit 110. Herein, the position of the image preview interface 30 may be determined to be one of the plurality of display areas 111 to 119, based on the position of the second body 20 with respect to the first body 10. More specifically, in the case that the capturing direction of the camera unit included in the second body 20 is within a predetermined range of angle, the HMD 100 may display the image preview interface 30 on one of the display areas based on the position of the second body 20 with respect to the first body 10.

In the embodiment of FIG. 5, the position of the second body 20 with respect to the first body 10 may correspond to the lower right end with respect to the first body 10. That is, the second body 20a, 20b and 20c shown in FIG. 5 may be positioned in an area set to the lower right end. In addition, the camera unit included in the second body 20 may be directed at various angles. For example, the second body 20a, 20b and 20c shown in FIG. 5 may be directed within a predetermined range of angle in the lower right end are with respect to the first body 10.

In this case, since the capturing direction of the camera unit is within the predetermined range of angle, the HMD 100 may display the image preview interface 30 on the area 114 located at the lower right end among other display. In the embodiment of FIG. 5, the orientation of the camera unit included in the second body 20 is out of the predetermined range of angle, the HMD 100 may display the image preview interface 30 on an area other than the area 114.

Figure 6A:
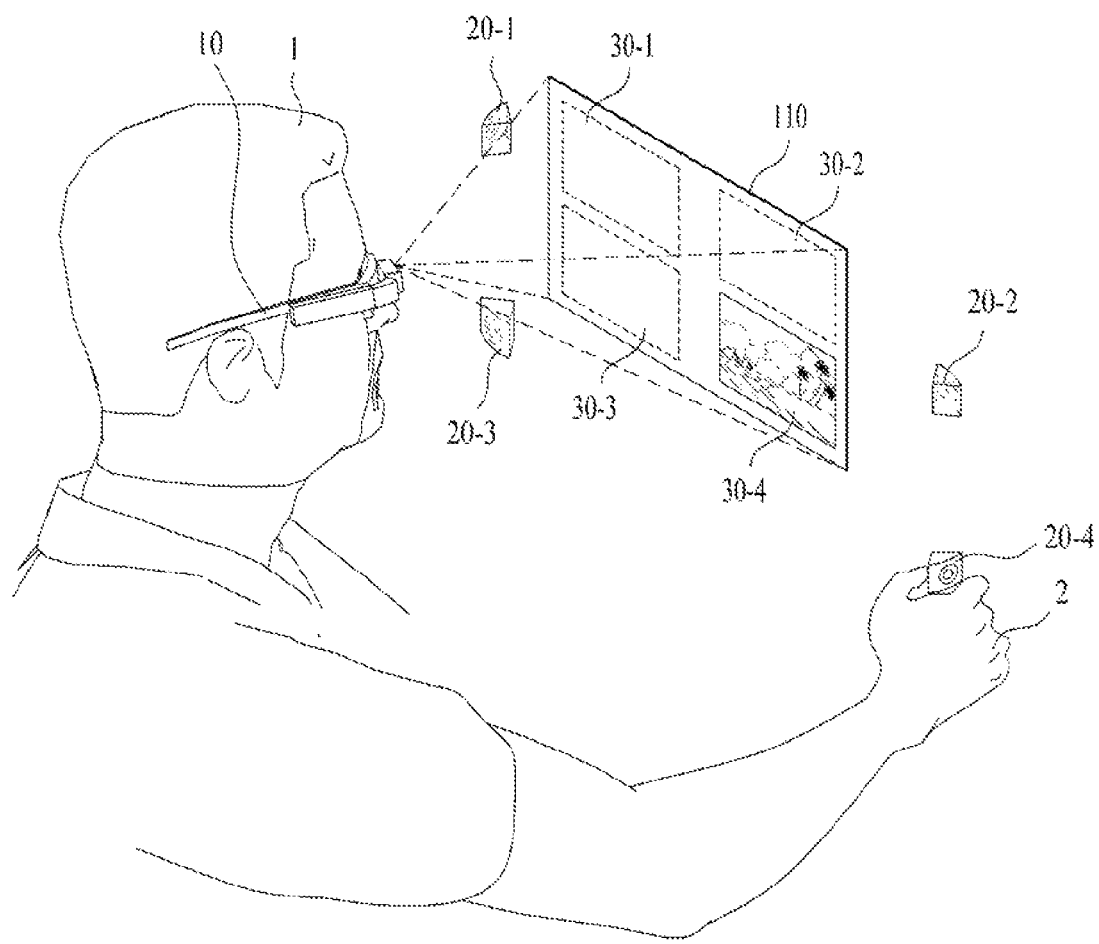
FIGS. 6a and 6b are views illustrating a method of controlling the HMD according to a fourth embodiment of this specification.
Figure 6B:
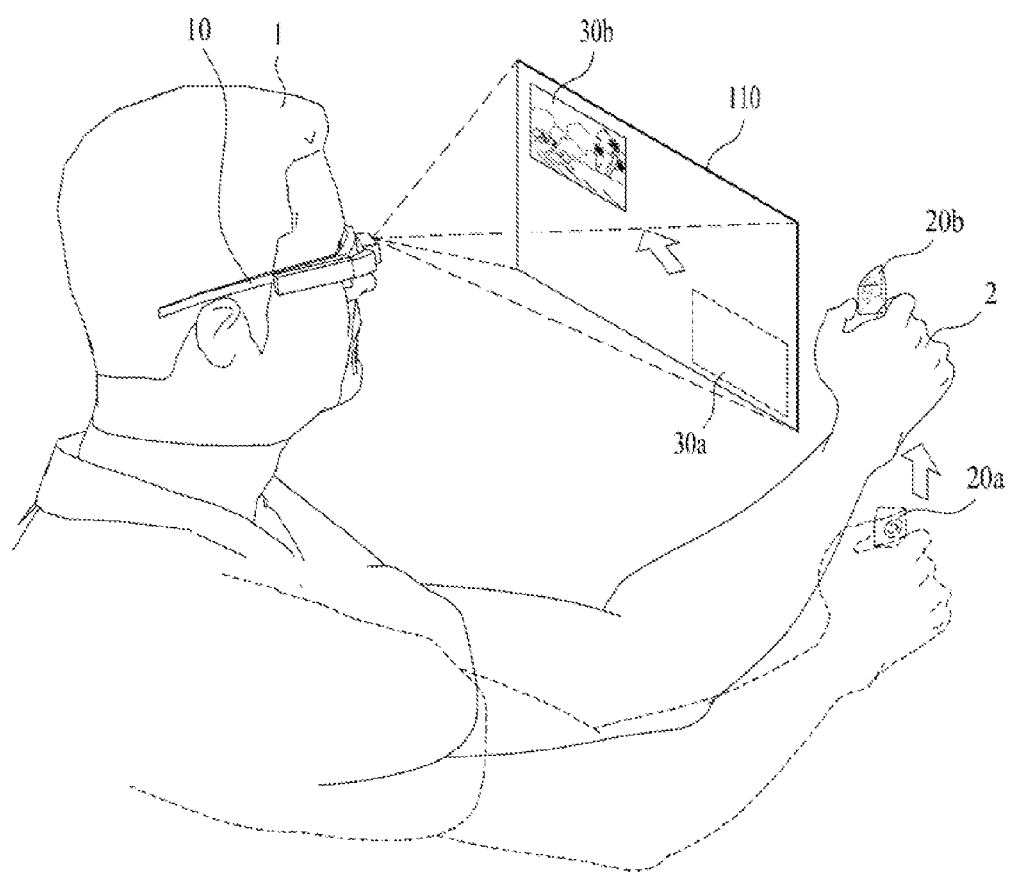

FIG. 6 is a view illustrating a method of controlling the HMD according to a fourth embodiment of this specification. More specifically, FIG. 6a illustrates displaying the image preview interface 30 based on the capturing direction of the camera unit included in the second body 20, and FIG. 6b illustrates displaying the image preview interface 30 based on the capturing direction of the camera unit included in the second body 20 and the position of the second body 20.

In one embodiment, as shown in 6a, the HMD 100 may acquire the capturing direction of the camera unit included in the second body 20. Herein, the capturing direction of the camera unit represents the direction in which the camera unit included in the second body 20 is oriented. In this case, the HMD 100 may display the image preview interface 30 on the display unit 110. The position of the image preview interface 30 may be determined based on the capturing direction of the camera unit. That is, the position of the image preview interface 30 may be determined based only on the capturing direction of the camera unit, regardless of the position of the second body 20.

For example, as shown in 6a, in the case that the camera unit 20-2 is oriented in the forward direction with respect to the user 1 wearing the HMD 100, the image preview interface 30-2 may be displayed on the upper right end of the display unit 110. In addition, in the case that the camera unit 20-4 is oriented in the rightward direction with respect to the user 1 wearing the HMD 100, the image preview interface 30-4 may be displayed on the lower right end of the display unit 110. In addition, in the case that the camera unit 20-1 is oriented in the leftward direction with respect to the user 1 wearing the HMD 100, the image preview interface 30-1 may be displayed on the upper left end of the display unit 110. However, embodiments are not limited to the above examples. The position of the image preview interface according to the capturing direction of the camera unit may be set in various ways.

In another embodiment as shown in FIG. 6b, the HMD 100 may acquire the position of the second body 20 with respect to the first body 10 and the capturing direction of the camera unit. Herein, the capturing direction of the camera unit is different from the aforementioned position of the second body 20 with respect to the first body 10. While the capturing direction of the camera unit represents the direction in which the camera unit is oriented regardless of the position of the second body 20, the position of the second body 20 with respect to the first body 10 represents a relative position of the second body 20 with respect to the first body 10 regardless of the direction in which the camera unit included in the second body 20 is oriented.

Next, the HMD 100 may display the image preview interface 30 on the display unit 110. Herein, the position of the image preview interface 30 may be determined based on the position of the second body 20 with respect to the first body 10 and the capturing direction of the camera unit. Referring to FIG. 6b, in the case that the second body 20 is positioned at the lower right end with respect to the first body 10, the camera unit 20a of the second body 20 may be oriented in the rightward direction. In this case, the HMD 100 may display the image preview interface 30 on the lower right end of the display unit 110. When the case that the second body 20 is positioned at the lower right end with respect to the first body 10, the camera unit of the second body 20 may be oriented in the leftward direction. In this case, the HMD 100 may display the image preview interface 30 on the lower left end of the display unit 110.

Also, in another embodiment, the HMD 100 may acquire change of the position of the second body 20 with respect to the first body 10 and change of the capturing direction of the camera unit included in the second body 20. For example, referring to FIG. 6b, the position of the second body 20 with respect to the first body 10 has changed from the lower right end to the upper right end with respect to the first body 10 according to change in position of the hand 2 of the user 1 holding the second body 20. Also, for example, referring to FIG. 6b, the capturing direction of the camera unit included in the second body 20 has changed from the rightward direction to the leftward direction.

In this case, the HMD 100 may change the position of the image preview interface 30 based on the changed position of the second body 20 and the changed capturing direction of the camera unit. Referring to FIG. 6b, the HMD 100 may move the image preview interface 30 from the lower end to the upper end according change in position of the second body 20 to the upper end. In addition, the HMD 100 may move the image preview interface 30 from the right side to the left side according to change of orientation of the camera unit from the rightward direction to the leftward direction.

Figure 7A:
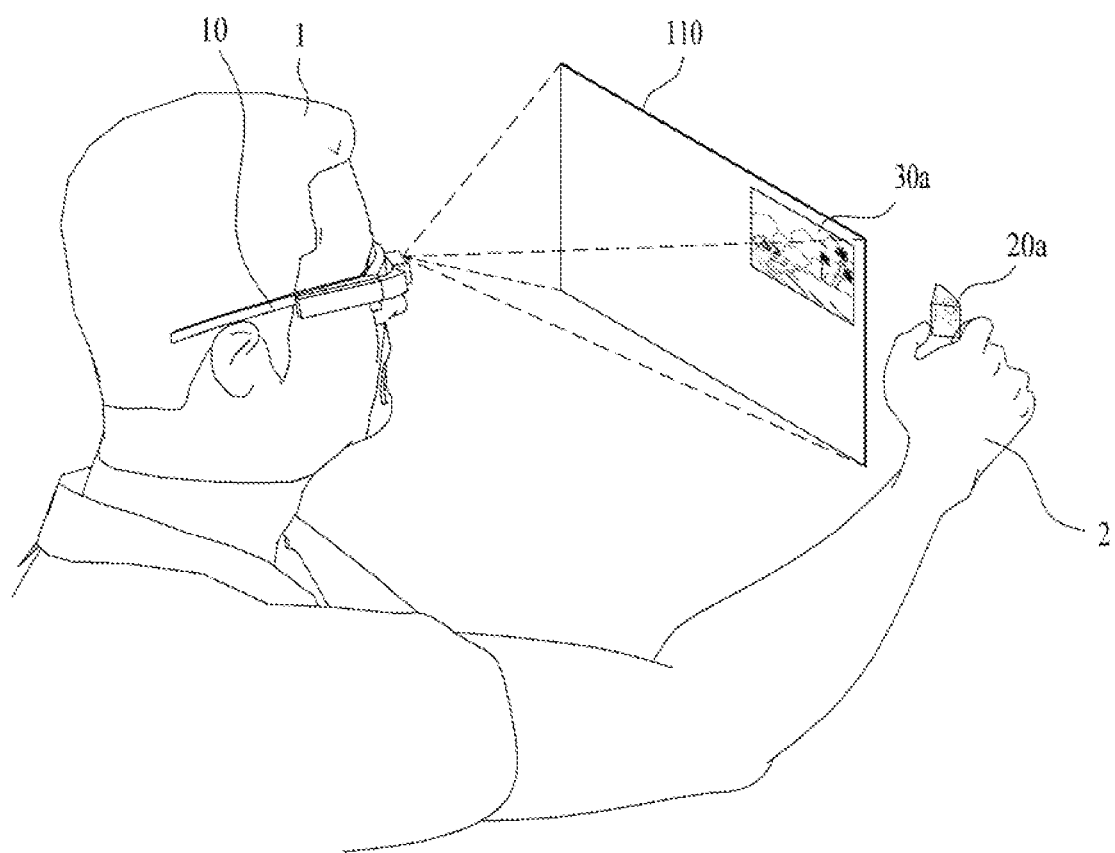
FIGS. 7a to 7c are views illustrating a method of controlling the HMD according to a fifth embodiment of this specification.
Figure 7B:
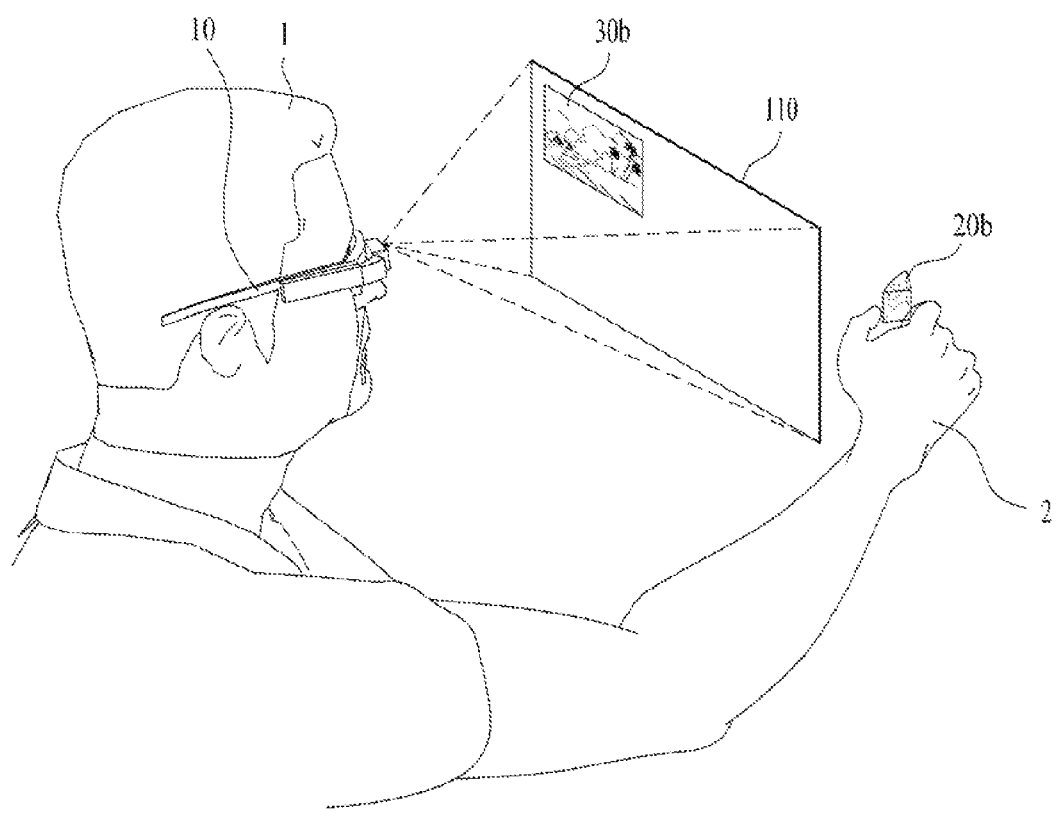
Figure 7C:
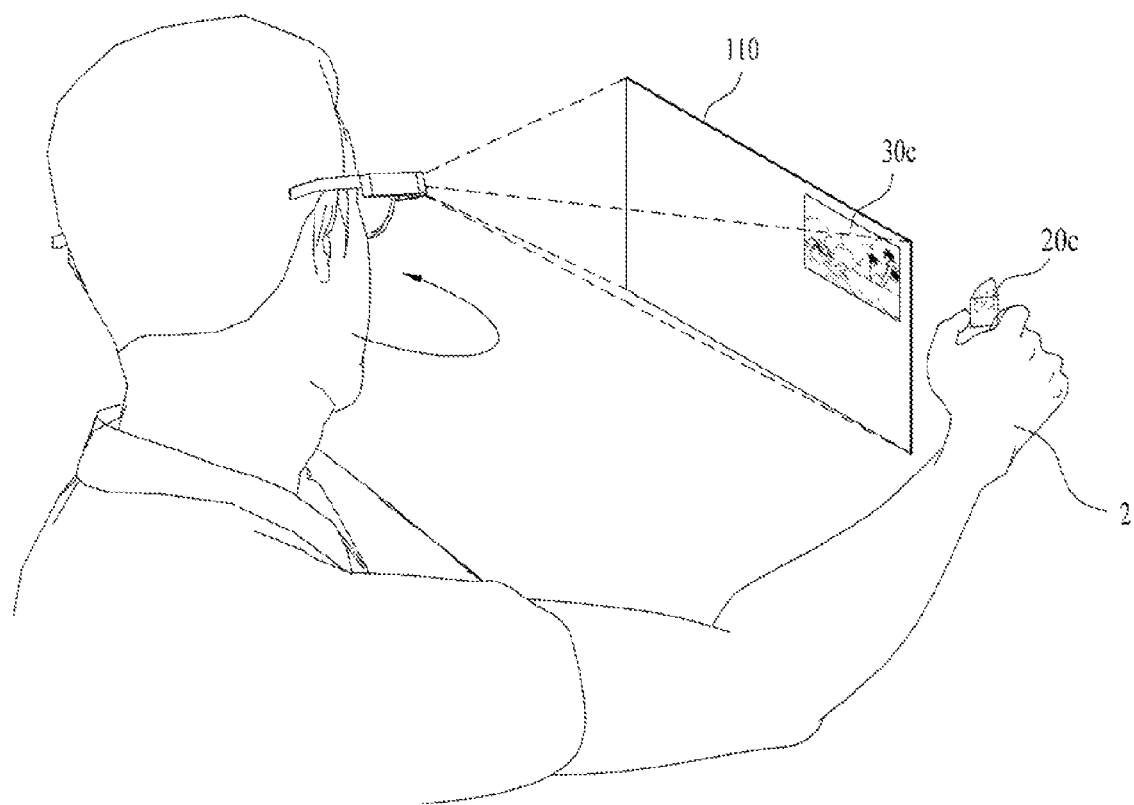

FIG. 7 is a view illustrating a method of controlling the HMD according to a fifth embodiment of this specification. More specifically, FIGS. 7a to 7c illustrate displaying the image preview interface 30 based on the capturing direction of the camera unit included in the second body 20 and the direction of the first body 10.

In one embodiment, the HMD 100 may acquire the capturing direction of the camera unit included in the second body 20 and the direction of the first body 10. Herein, the direction of the first body 10 may correspond to the direction in which the user 1 wearing the HMD 100 is oriented. For example, in FIG. 7a, the direction of the first body 10 may be the forward direction.

In this case, the HMD 100 may display the image preview interface 30 on the display unit 110. Herein, the position of the image preview interface 30 may be determined based on the orientation of the camera unit and the direction of the first body 10. In this case, the position of the second body 20 with respect to the first body 10 may not be considered. For example, as shown in FIG. 7a, the capturing direction of the camera unit and the direction of the first body 10 are the forward direction, the HMD 100 may display the image preview interface 30 on the upper right end of the display unit 110. Herein, the position of the image preview interface 30 according to the capturing direction of the camera unit and the direction of the first body 10 may be set in various ways.

In another embodiment, as shown in FIGS. 7a to 7c, the HMD 100 may acquire change of the capturing direction of the camera unit included in the second body 20 and change of direction of the first body 10. For example, referring to FIGS. 7a and 7b, the capturing direction of the camera unit included in the second body 20 has changed from the forward direction to the leftward direction, and the direction of the first body 10 is maintained as the forward direction. In addition, for example, referring to FIGS. 7b and 7c, the capturing direction of the camera unit included in the second body 20 has is maintained as the leftward direction, while the direction of the first body 10 has changed from the forward direction to the leftward direction.

In this case, the HMD 100 may change the position of the image preview interface 30 based on the changed capturing direction of the camera unit and the changed direction of the first body 10. For example, referring to FIGS. 7a and 7b, as the direction of the first body 10 is maintained, and the capturing direction of the camera unit is changed from the forward direction to the leftward direction, the HMD 100 may change the position of the image preview interface 30 from the upper right end 30a the upper left end 30b. In addition, for example, referring to FIGS. 7b and 7c, as the capturing direction of the camera unit is maintained and the direction of the first body 10 changes to the leftward direction, the HMD 100 may change the position of the image preview interface 30 from the upper left end 30b to the upper right end 30a. Herein, change of the position of the image preview interface 30 may be determined based on the change in the relative direction between the capturing direction of the camera unit and the first body 10 after the change of the position of the image preview interface 30.

Figure 8:
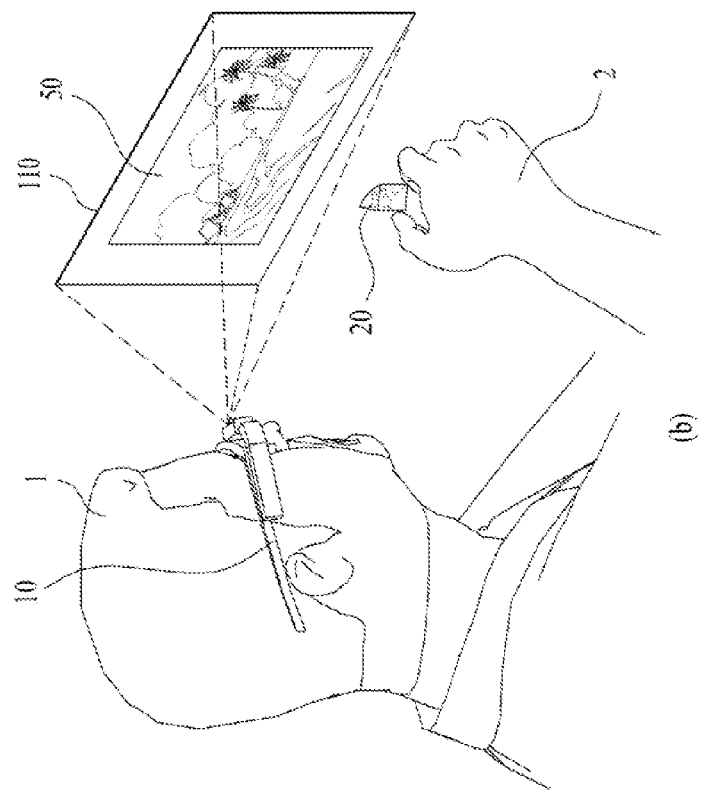
FIG. 8 is a view illustrating a method of controlling the HMD according to a sixth embodiment of this specification
Figure 8:
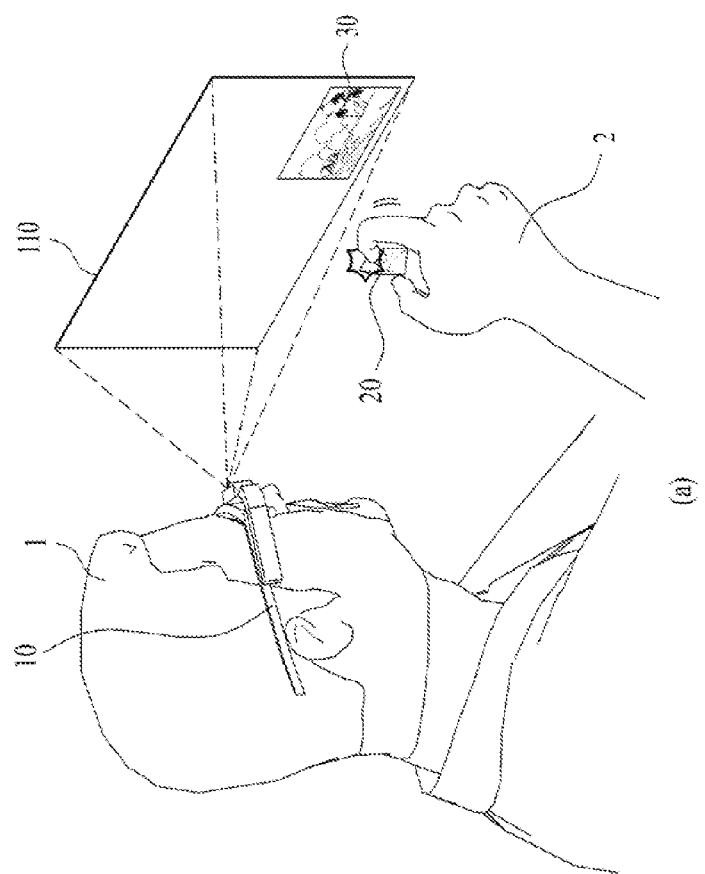

FIG. 8 is a view illustrating a method of controlling the HMD according to a sixth embodiment of this specification. More specifically, FIG. 8(a) illustrates capturing an image sensed through the image preview interface 30, FIG. 8(b) illustrates displaying an image review interface 50.

As shown in FIG. 8(a), the HMD 100 may detect an image capturing signal. Herein, the image capturing signal may correspond to various signals for capturing an image. For example, the image capturing signal may include a touch input and an audio input to the first body 10 or the second body 20. In FIG. 8(a), the image capturing signal may be a touch input to the second body 20 in the hand 2 of the user 1.

Next, the HMD 100 may capture the image based on the detected image capturing signal. Next, as shown in FIG. 8(b), the HMD 100 may display the image review interface 50 configured to display the captured image. Herein, the captured image may be temporarily displayed on the image review interface 50. In addition, the HMD 100 may display the captured image through the image review interface 50 before storing the captured image. Thereby, the user 1 may confirm the captured image.

Although not shown in FIG. 8, the HMD 100 may detect a half-capturing signal. Herein, the half-capturing signal may be a signal for adjusting a focus to capture the sensed image. For example, half-capturing signal may be a touch input to the first body 10 or the second body 20 in the hand 2 of the user 1, and may correspond to the half intensity of the touch of the image capturing signal. In addition, the half-capturing signal may correspond to an audio input from the user 1.

In this case, the HMD 100 may increase the size of the image preview interface 30 and display the image preview interface 30 on the display unit 110 based on the detected half-capturing signal. That is, in the case that the image preview interface 30 displayed on the display unit 110 is small, the image preview interface 30 may be enlarged through the half-capturing signal and displayed, thereby allowing the user 1 to clearly recognize an image sensed through the camera unit. Accordingly, the user 1 may confirm the image displayed on the image preview interface 30, and then capture the image through a touch input for capturing the image.

FIG. 9 is a flowchart illustrating a method of controlling the HMD of this specification.

First, in the case that the second body is detached from the first body, the HMD may acquire the position of the second body with respect to the first body (S910). As described above with reference to FIG. 3, the position of the second body with respect to the first body may correspond to the direction of the second body with respect to the first body.

Next, the HMD may display, on a display unit, an image preview interface of an image sensed through a camera unit (S920). Herein, the position of the image preview interface may be determined based on the position of the second body with respect to the first body. In addition, the HMD may display a separated-mode indicator on the display unit.

Further, while embodiments have been described with reference to each of the drawings, a new embodiment may be implemented by combining the embodiments illustrated in the drawings. In addition, designing a recording medium readable by a computer having a recorded program for implementation of the previously described embodiments, as desired by those skilled in the art is also within the scope of this specification.

The configurations and methods according to the above-described embodiments will not be applicable in a limited way to the foregoing HMD and method of controlling the same, and all or parts of the embodiments may be selectively combined and configured to make various modifications thereto.

Meanwhile, a method of controlling the HMD may be implemented on a recording medium readable by a processor provided to a network device as code readable by a processor. The recording media readable by the processor include all kinds of recording devices that store data readable by the processor. Examples of the recording media readable by the processor may include ROM, RAM, CD-ROMs, magnetic tape, floppy disks, and optical data storage devices, and may also include a device implemented in the form of a carrier wave such as, for example, transmission via the Internet. In addition, the recording media readable by the processor may be distributed in computer systems connected to each other over a network, and thus code readable by the processor may be stored and executed in a distributed manner.

As is apparent from the above description, the present invention has effects as follows.

According to one embodiment, the position of an image preview interface within a display unit is determined based on the position of a camera with respect to a head-mounted display (HMD). Accordingly, a user may readily recognize the position of the camera based on the position of the image preview interface.

According to another embodiment, the position of the image preview interface within the display unit is determined based on the capturing direction of a camera unit. Accordingly, the user may readily recognize the capturing direction of the camera unit based on the position of the image preview interface.

According to another embodiment, the HMD increases or decreases the size of the image preview interface according to the distance between the HMD and the camera unit. Accordingly, the user may readily recognize the distance from the camera unit based on the size of the image preview interface.

According to another embodiment, the HMD may change the position of the image preview interface in various ways according to the capturing direction of the camera unit and a relative change of orientation of the HMD.

Other effects of the invention are disclosed in detail in the detailed description of this specification.

Although preferred embodiments have been shown and described, this specification is not limited to the above embodiments. It will be apparent to those skilled in the art that various modifications and variations can be made in this specification without departing from the spirit or scope of this specification. Thus, it is intended that the present invention covers the modifications and variations of this invention provided they come within the scope of the appended claims and their equivalents. These variations should not be individually construed from the technical spirit or prospect of this specification.

In this specification, both a product and a method have been described as the invention. Descriptions thereof are supplementarily applicable, when necessary.

What is claimed is:

1. A head-mounted display (HMD) comprising a first body and a second body, wherein: the first body comprises: a display unit configured to display visual information; a first communication unit configured to transmit/receive data; and a processor configured to control the display unit and the first communication unit; and the second body comprises: a camera unit configured to sense an image; a second communication unit configured to transmit/receive data; and a sensor unit configured to detect an input signal, wherein the second body is mountable to and detachable from the first body, wherein, when the second body is detached from the first body, the processor is further configured to: acquire a position of the second body with respect to the first body, and display, on the display unit, an image preview interface of the image sensed through fine camera unit, wherein a position of the image preview interface is determined based on the position of the second body with respect to the first body, wherein the processor is further configured to: acquire a distance between the first body and the second body, and display the image preview interface on the display unit, wherein a size of the image preview interface is determined based on the distance between the first body and the second body.

2. The HMD according to claim 1, wherein the position of the second body with respect to the first body represents a direction of the second body with respect to the first body.

3. The HMD according to claim 1, wherein the processor is further configured to: acquire a change of the position of the second body with respect to the first body, and change the position of the image preview interface in response to the change of the position of the second body.

4. The HMD according to claim 1, wherein the processor is further configured to: increase the size of the image preview interface when the distance between the first body and the second body decreases with respect to a predetermined distance, and reduce the size of the image preview interface when the distance between the first body and the second body increases with respect to the predetermined distance.

5. The HMD according to claim 1, wherein the processor is further configured to: acquire a gaze location of a user with respect to the display unit and the position of the second body with respect to the first body, and display the image preview interface on the display unit, wherein the position of the image preview interface is determined based on the position of the second body with respect to the first body.

6. The HMD according to claim 5, wherein the processor is further configured to display at least one object on the display unit, wherein a position of the object is determined based on the gaze location of the user w4th respect to the display unit.

7. The HMD according to claim 1, wherein the processor is further configured to: divide the display unit into a plurality of display areas, and display the image preview interface, wherein the position of the image preview interface is determined to be one of the plurality of display areas based on the position of the second body with respect to the first body.

8. The HMD according to claim 7, wherein, when a capturing direction of the camera unit included in the second body is within a predetermined range of angle, the processor is further configured to display the image preview interface on one of the plurality of display areas based on the position of the second body with respect to the first body.

9. The HMD according to claim 1, wherein the processor is further configured to: acquire a capturing direction of the camera unit included in the second body, and display the image preview interface on the display unit, wherein the position of the image preview interface is determined based on the capturing direction of the camera unit.

10. The HMD according to claim 9, wherein the processor is further configured to: acquire the position of the second body with respect to the first body and the capturing direction of the camera unit included in the second body, and display the image preview interface on the display unit, wherein the position of the image preview interface is determined based on the position of the second body with respect to the first body and the capturing direction of the camera unit.

11. The HMD according to claim 9, wherein the processor is further configured to: acquire a change of the position of the second body with respect to the first body and a change of the capturing direction of the camera unit included in the second body, and change the position of the image preview interface based on a changed position of the second body and a changed capturing direction of the camera unit.

12. The HMD according to claim 1, wherein the processor is further configured to: acquire the capturing direction of the camera unit included in the: second body and a direction of the first body, and display the image preview interlace, wherein the position of the image preview interface is determined based on the: capturing direction of the camera unit and the direction of the first body.

13. The HMD according to claim 12, wherein the processor is further configured to: acquire a change of the capturing direction of the camera unit included in the second body and a change of the direction of the first body, and change the position of the image preview interface based on a changed capturing direction of the camera unit and a changed direction of the first body.

14. The HMD according to claim 12, wherein the direction of the first body indicates a direction in which a front surface of the first body faces.

15. The HMD according to claim 1, the processor is further configured to: detect an image capturing signal, capture an image based on the detected image capturing signal, and display an image review interface displaying the captured image and then store the captured image.

16. The HMD according to claim 1, wherein the processor is further configured to: acquire a gaze location of a user with respect to the display unit, detect a video capturing signal, and display the image preview interface based on the detected video capturing signal, wherein the position of the image preview interface is determined based on the gaze location of the user.

17. The HMD according to claim 1, wherein the processor is further configured to: detect a half-capturing signal, and enlarge and display the image preview interface based on the detected half-capturing signal.

18. A method of controlling a head-mounted display including a first body and a second body, the method comprising, when the second body is detached from the first body, acquiring a position of the second body with respect to the first body; and displays, on a display unit, an image preview interface of an image sensed through, a camera unit, wherein a position of the image preview interface is determined based on the position of the second body with respect to the first body and a size of the image preview interface is determined based on the distance between the first body and the second body.

\* \* \* \* \*